(12) United States Patent
Jin et al.

(10) Patent No.: US 11,038,587 B2
(45) Date of Patent: Jun. 15, 2021

(54) METHOD AND APPARATUS FOR LOCATING FAULT CAUSE, AND STORAGE MEDIUM

(71) Applicant: Huawei Technologies Co., Ltd., Shenzhen (CN)

(72) Inventors: Sheng Jin, Shenzhen (CN); Yuming Xie, Nanjing (CN); Dewei Bao, Nanjing (CN); Zhiman Xiong, Shenzhen (CN); Yunpeng Gao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/805,200

(22) Filed: Feb. 28, 2020

(65) Prior Publication Data

US 2020/0204253 A1 Jun. 25, 2020

Related U.S. Application Data

(63) Continuation of application No. PCT/CN2018/085332, filed on May 2, 2018.

(30) Foreign Application Priority Data

Aug. 31, 2017 (CN) .......................... 201710773847.7

(51) Int. Cl.
*H04B 10/25* (2013.01)
*H04B 10/079* (2013.01)
*H04J 14/02* (2006.01)

(52) U.S. Cl.
CPC ......... *H04B 10/0791* (2013.01); *H04B 10/25* (2013.01); *H04J 14/02* (2013.01)

(58) Field of Classification Search
CPC .. H04B 10/071; H04B 10/0791; H04B 10/25; H04J 14/02
See application file for complete search history.

(56) References Cited

U.S. PATENT DOCUMENTS

2002/0101631 A1 8/2002 Gerstel et al.
2003/0210908 A1 11/2003 Levy et al.
(Continued)

FOREIGN PATENT DOCUMENTS

CN 101753207 A 6/2010
CN 101841738 A 9/2010
(Continued)

OTHER PUBLICATIONS

EP/18852062, Search Report, dated Oct. 6, 2020.
(Continued)

*Primary Examiner* — Dzung D Tran
(74) *Attorney, Agent, or Firm* — Leydig, Voit & Mayer, Ltd.

(57) ABSTRACT

A method and an apparatus for locating a fault cause are provided. The method includes: obtaining parameter values of a plurality of running parameters and a parameter value of a fault parameter in preset duration before a wavelength division multiplexing board device is faulty; determining a correlation between each of the plurality of running parameters and the fault parameter; and determining at least one target parameter from the plurality of running parameters based on a value of the correlation, where a correlation between each of the at least one target parameter and the fault parameter is greater than a correlation between the fault parameter and a running parameter other than the at least one target parameter in the plurality of running parameters. Accuracy of locating a fault cause can be improved in the embodiments of the present disclosure.

18 Claims, 6 Drawing Sheets

(56) References Cited

U.S. PATENT DOCUMENTS

| | | | |
|---|---|---|---|
| 2007/0140689 A1* | 6/2007 | Haran | H04B 10/077 398/27 |
| 2012/0008939 A1* | 1/2012 | Yang | H04Q 11/0067 398/17 |
| 2015/0139637 A1* | 5/2015 | Vall-Llosera | H04B 10/0791 398/14 |
| 2017/0005934 A1* | 1/2017 | Hironaka | H04L 49/505 |

FOREIGN PATENT DOCUMENTS

| | | |
|---|---|---|
| CN | 104301037 A | 1/2015 |
| CN | 105375982 A | 3/2016 |
| CN | 106330299 A | 1/2017 |
| WO | 2007010518 A1 | 1/2007 |

OTHER PUBLICATIONS

Xiao et al.,"Y.INADF: Framework for Intelligent Network Analytics and Diagnostics," International Telecommunication Union, SG12-C.53 R1, Study Group 12, Geneva (Server date: Dec. 23, 2016).

* cited by examiner

METHOD AND APPARATUS FOR LOCATING FAULT CAUSE, AND STORAGE MEDIUM

CROSS-REFERENCE TO RELATED APPLICATIONS

This application is a continuation of International Application No. PCT/CN2018/085332, filed on May 2, 2018, which claims priority to Chinese Patent Application No. 201710773847.7, filed on Aug. 31, 2017. The disclosures of the aforementioned applications are hereby incorporated by reference in their entireties.

TECHNICAL FIELD

The present disclosure relates to the field of communications technologies, and in particular, to a method and an apparatus for locating a fault cause, and a storage medium.

BACKGROUND

As a transmission technology in fiber-optic communication, wavelength division multiplexing (WDM for short) means converting input signals of a client into colored signals that meet a WDM standard, to transmit the signals on a same optical fiber. A wavelength division multiplexing board, also referred to as a wavelength division multiplexing board device, is a device that implements wavelength division multiplexing conversion. An input end of the wavelength division multiplexing board inputs various signals of the client, and an output end outputs colored signals that are obtained through conversion and that meet an optical transport network standard. A plurality of types of wavelength division multiplexing boards may exist according to functions, separately correspond to different optical multiplexing/demultiplexing functions, and may be specifically an optical amplifier board, an optical power amplifier board, a line service processing board, and the like. Therefore, the wavelength division multiplexing board is widely used in a communications network. The optical amplifier board may be an optical amplifier unit OAU or a board including an OAU. The optical power amplifier board may be an optical power amplifier unit OBU (optical booster unit) or a board including an OBU.

In terms of maintenance of the communications network, most communication faults are caused by a hardware quality problem. The hardware quality problem mainly includes a fault of the wavelength division multiplexing board device. Therefore, locating a fault cause of the wavelength division multiplexing board device becomes an important requirement for improving operation and maintenance quality of a product.

The wavelength division multiplexing board device includes a large quantity of components (such as a component and a pin). That the wavelength division multiplexing board device is faulty is usually that a component of the wavelength division multiplexing board device is faulty, and the fault of the component is usually presented as abnormality of a parameter of the component (a parameter that is abnormal when the wavelength division multiplexing board device is faulty is subsequently referred to as a fault parameter), for example, a frequency offset jump or optical power abnormality. A fault of a component of the wavelength division multiplexing board device is usually caused by abnormality of a parameter of another component. Therefore, in the prior art, a fault cause is usually located through manual check by using a physical connection relationship between the components of the wavelength division multiplexing board device and a preset impact relationship between parameters of the components, that is, a parameter that is of another component and that results in abnormality of the fault parameter is determined.

However, there are many components and pins in the wavelength division multiplexing board device, and a structure is complex. In addition, the preset impact relationship between the parameters of the components is limited to manual experience. Consequently, accuracy of locating a fault cause in the prior art is usually relatively low.

SUMMARY

This application provides a method and an apparatus for locating a fault cause, and a storage medium, to improve accuracy of locating a fault cause of a wavelength division multiplexing board device.

According to a first aspect, this application provides a method for locating a fault cause, including:

obtaining parameter values of a plurality of running parameters and a parameter value of a fault parameter in preset duration before a wavelength division multiplexing board device is faulty, where the fault parameter is a parameter that is abnormal when the wavelength division multiplexing board device is faulty;

determining a correlation between each of the plurality of running parameters and the fault parameter based on the parameter values of the plurality of running parameters and the parameter value of the fault parameter, where the correlation represents a correlation degree between a parameter value change of a running parameter and a parameter value change of a fault parameter; and determining at least one target parameter from the plurality of running parameters based on a value of the correlation, where a correlation between each of the at least one target parameter and the fault parameter is greater than a correlation between the fault parameter and a running parameter other than the at least one target parameter in the plurality of running parameters.

In this application, the correlation between each running parameter and the fault parameter is determined by analyzing the parameter values of the running parameters and the parameter value of the fault parameter in the preset duration before the faulty wavelength division multiplexing board device is faulty, and the target parameter is determined based on the value of the correlation. In the implementation of the first aspect in this application, the correlation between the determined target parameter and the fault parameter is relatively large. Therefore, the target parameter is closely related to abnormality of the fault parameter, and the target parameter is very likely to result in the abnormality of the fault parameter (for example, abnormality of the target parameter results in the abnormality of the fault parameter), that is, the target parameter is very likely to result in a fault of the wavelength division multiplexing board device. Therefore, accuracy of locating a fault cause of the wavelength division multiplexing board device can be improved in the implementation of the first aspect in this application.

With reference to the first aspect, in a first implementation of the first aspect, the correlation between each of the at least one target parameter and the fault parameter is greater than a correlation threshold.

With reference to the first aspect or the foregoing implementation of the first aspect, in a second implementation of the first aspect, a time at which a parameter value of the at least one target parameter is abnormal is before a time at which the parameter value of the fault parameter is abnormal.

With reference to the first aspect or the foregoing implementations of the first aspect, in a third implementation of the first aspect, the correlation includes a time correlation, the time correlation represents a correlation degree between a parameter value of a running parameter at a first moment and a parameter value of a fault parameter at a second moment, and the first moment is earlier than the second moment; and the determining a correlation between each running parameter and the fault parameter based on the parameter values of the plurality of running parameters and the parameter value of the fault parameter includes:

calculating a time correlation between a parameter value of each running parameter at the first moment and a parameter value of the fault parameter at the second moment; and the determining at least one target parameter from the plurality of running parameters based on a value of the correlation includes:

determining the at least one target parameter from the plurality of running parameters based on a value of the time correlation, where a time correlation between the at least one target parameter and the fault parameter is greater than a time correlation threshold.

In this application, the time correlation between each running parameter and the fault parameter is determined, the target parameter is determined based on the value of the time correlation, and the time at which the determined target parameter is abnormal is before the time at which the parameter value of the fault parameter is abnormal. Therefore, a cause that results in the abnormality of the fault parameter in the wavelength division multiplexing board device can be more accurately located.

With reference to the first aspect or the foregoing implementations of the first aspect, in a fourth implementation of the first aspect, the correlation further includes a change correlation, and the change correlation represents dependence between a parameter value change of a running parameter and a parameter value change of a fault parameter; and the determining a correlation between each running parameter and the fault parameter based on the parameter values of the plurality of running parameters and the parameter value of the fault parameter further includes:

calculating a change correlation between each running parameter and the fault parameter; and the determining at least one target parameter from the plurality of running parameters based on a value of the correlation includes:

determining the at least one target parameter from the plurality of running parameters based on the value of the time correlation and a value of the change correlation, where the time correlation between the at least one target parameter and the fault parameter is greater than the time correlation threshold, and a change correlation between the at least one target parameter and the fault parameter is greater than a change correlation threshold.

With reference to the first aspect or the foregoing implementations of the first aspect, in a fifth implementation of the first aspect, the correlation includes a change correlation, and the change correlation represents dependence between a parameter value change of a running parameter and a parameter value change of a fault parameter; and the determining a correlation between each running parameter and the fault parameter based on the parameter values of the plurality of running parameters and the parameter value of the fault parameter includes:

calculating a change correlation between each running parameter and the fault parameter; and the determining at least one target parameter from the plurality of running parameters based on a value of the correlation includes:

determining the at least one target parameter from the plurality of running parameters based on a value of the change correlation, where a change correlation between the at least one target parameter and the fault parameter is greater than a change correlation threshold.

With reference to the first aspect or the foregoing implementations of the first aspect, in a sixth implementation of the first aspect, the calculating a parameter value change correlation between each running parameter and the fault parameter includes:

calculating a first change probability of each running parameter, a second change probability of the fault parameter, and a combined change probability of each running parameter and the fault parameter, where the first change probability represents a probability that a parameter value of a running parameter changes in the preset duration, the second change probability represents a probability that a parameter value of a fault parameter changes in the preset duration, and the combined change probability represents a probability that the parameter value of the running parameter and the parameter value of the fault parameter simultaneously change in the preset duration; and calculating the change correlation between each running parameter and the fault parameter based on the first change probability of each running parameter, the second change probability of the fault parameter, and the combined change probability of each running parameter and the fault parameter.

With reference to the first aspect or the foregoing implementations of the first aspect, in a seventh implementation of the first aspect, the calculating a first change probability of each running parameter, a second change probability of the fault parameter, and a combined change probability of each running parameter and the fault parameter includes:

dividing the preset duration into at least two equal time periods;

calculating a first parameter value change range of each running parameter in the preset duration and a second parameter value change range of each running parameter in each time period based on the parameter value of each running parameter;

determining a ratio of the second parameter value change range of each running parameter in each time period to the first parameter value change range as a first time period change probability of each running parameter in each time period;

calculating a third parameter value change range of the fault parameter in the preset duration and a fourth parameter value change range of the fault parameter in each time period based on the parameter value of the fault parameter;

determining a ratio of the fourth parameter value change range of the fault parameter in each time period to the third parameter value change range as a second time period change probability of the fault parameter in each time period; and calculating the first change probability of each running parameter based on the first time period change probability of each running parameter in each time period, calculating the second change probability of the fault parameter based on the second time period change probability of the fault parameter in each time period, and calculating the combined change probability of each running parameter and the fault parameter based on the first time period change probability of each running parameter in each time period and the second time period change probability of the fault parameter in each time period.

In this application, for each running parameter, the parameter value of each running parameter is mapped as a change probability that is used as a dimensionless value to measure an average change of each running parameter in each time period. Therefore, a change probability correlation can be calculated without considering a unit and a type of each running parameter, thereby implementing normalization of each running parameter.

With reference to the first aspect or the foregoing implementations of the first aspect, in an eighth implementation of the first aspect, some or all of the at least one target parameter are used to warn of the fault parameter.

With reference to the first aspect or the foregoing implementations of the first aspect, in a ninth implementation of the first aspect, after the determining at least one target parameter from the plurality of running parameters based on a value of the correlation, the method further includes:

for each of the at least one target parameter, determining a distribution feature of normal parameter values of the target parameter in target duration when the wavelength division multiplexing board device normally runs and a distribution feature of abnormal parameter values of the target parameter in the target duration when the wavelength division multiplexing board device is faulty; and determining, from the at least one target parameter, the some or all target parameters used to warn of the fault parameter, where a difference between the distribution feature of the normal parameter values and the distribution feature of the abnormal parameter values that are of each of the determined some or all target parameters is greater than or equal to a preset standard value.

With reference to the first aspect or the foregoing implementations of the first aspect, in a tenth implementation of the first aspect, after the determining a target parameter from the plurality of running parameters based on a value of the correlation, the method further includes:

warning of the fault parameter by monitoring the some or all of the at least one target parameter.

With reference to the first aspect or the foregoing implementations of the first aspect, in an eleventh implementation of the first aspect, the warning of the fault parameter by monitoring the target parameter includes:

when it is detected that one or more of warning parameters are abnormal, outputting warning information, where the warning parameters are the some or all of the at least one target parameter, and the warning information is used to give a prompt that the fault parameter is to be abnormal.

According to a second aspect, this application provides an apparatus for locating a fault cause, including:

an obtaining unit, configured to obtain parameter values of a plurality of running parameters and a parameter value of a fault parameter in preset duration before a wavelength division multiplexing board device is faulty, where the fault parameter is a parameter that is abnormal when the wavelength division multiplexing board device is faulty; and a determining unit, configured to determine a correlation between each of the plurality of running parameters and the fault parameter based on the parameter values of the plurality of running parameters and the parameter value of the fault parameter, where the correlation represents a correlation degree between a parameter value change of a running parameter and a parameter value change of a fault parameter, where the determining unit is further configured to determine at least one target parameter from the plurality of running parameters based on a value of the correlation, where a correlation between each of the at least one target parameter and the fault parameter is greater than a correlation between the fault parameter and a running parameter other than the at least one target parameter in the plurality of running parameters.

With reference to the second aspect, in a first implementation of the second aspect, the correlation between each of the at least one target parameter and the fault parameter is greater than a correlation threshold.

With reference to the second aspect or the foregoing implementation of the second aspect, in a second implementation of the second aspect, a time at which a parameter value of the at least one target parameter is abnormal is before a time at which the parameter value of the fault parameter is abnormal.

With reference to the second aspect or the foregoing implementations of the second aspect, in a third implementation of the second aspect, the correlation includes a time correlation, the time correlation represents a correlation degree between a parameter value of a running parameter at a first moment and a parameter value of a fault parameter at a second moment, and the first moment is earlier than the second moment; and the determining unit is specifically configured to:

calculate a time correlation between a parameter value of each running parameter at the first moment and a parameter value of the fault parameter at the second moment; and determine the at least one target parameter from the plurality of running parameters based on a value of the time correlation, where a time correlation between the at least one target parameter and the fault parameter is greater than a time correlation threshold.

With reference to the second aspect or the foregoing implementations of the second aspect, in a fourth implementation of the second aspect, the correlation further includes a change correlation, and the change correlation represents dependence between a parameter value change of a running parameter and a parameter value change of a fault parameter; and the determining unit is further configured to:

calculate a change correlation between each running parameter and the fault parameter; and determine the at least one target parameter from the plurality of running parameters based on the value of the time correlation and a value of the change correlation, where the time correlation between the at least one target parameter and the fault parameter is greater than the time correlation threshold, and a change correlation between the at least one target parameter and the fault parameter is greater than a change correlation threshold.

With reference to the second aspect or the foregoing implementations of the second aspect, in a fifth implementation of the second aspect, the correlation includes a change correlation, and the change correlation represents dependence between a parameter value change of a running parameter and a parameter value change of a fault parameter; and the determining unit is specifically configured to:

calculate a change correlation between each running parameter and the fault parameter; and determine the at least one target parameter from the plurality of running parameters based on a value of the change correlation, where a change correlation between the at least one target parameter and the fault parameter is greater than a change correlation threshold.

With reference to the second aspect or the foregoing implementations of the second aspect, in a sixth implementation of the second aspect, when calculating the parameter value change correlation between each running parameter and the fault parameter, the determining unit is specifically configured to:

calculate a first change probability of each running parameter, a second change probability of the fault parameter, and a combined change probability of each running parameter and the fault parameter, where the first change probability represents a probability that a parameter value of a running parameter changes in the preset duration, the second change probability represents a probability that a parameter value of a fault parameter changes in the preset duration, and the combined change probability represents a probability that the parameter value of the running parameter and the parameter value of the fault parameter simultaneously change in the preset duration; and calculate the change correlation between each running parameter and the fault parameter based on the first change probability of each running parameter, the second change probability of the fault parameter, and the combined change probability of each running parameter and the fault parameter.

With reference to the second aspect or the foregoing implementations of the second aspect, in a seventh implementation of the second aspect, when calculating the first change probability of each running parameter, the second change probability of the fault parameter, and the combined change probability of each running parameter and the fault parameter, the determining unit is specifically configured to:

divide the preset duration into at least two equal time periods;

calculate a first parameter value change range of each running parameter in the preset duration and a second parameter value change range of each running parameter in each time period based on the parameter value of each running parameter;

determine a ratio of the second parameter value change range of each running parameter in each time period to the first parameter value change range as a first time period change probability of each running parameter in each time period;

calculate a third parameter value change range of the fault parameter in the preset duration and a fourth parameter value change range of the fault parameter in each time period based on the parameter value of the fault parameter;

determine a ratio of the fourth parameter value change range of the fault parameter in each time period to the third parameter value change range as a second time period change probability of the fault parameter in each time period; and calculate the first change probability of each running parameter based on the first time period change probability of each running parameter in each time period, calculate the second change probability of the fault parameter based on the second time period change probability of the fault parameter in each time period, and calculate the combined change probability of each running parameter and the fault parameter based on the first time period change probability of each running parameter in each time period and the second time period change probability of the fault parameter in each time period.

With reference to the second aspect or the foregoing implementations of the second aspect, in an eighth implementation of the second aspect, some or all of the at least one target parameter are used to warn of the fault parameter.

With reference to the second aspect or the foregoing implementations of the second aspect, in a ninth implementation of the second aspect, the determining unit is further configured to: for each of the at least one target parameter, determine a distribution feature of normal parameter values of the target parameter in target duration when the wavelength division multiplexing board device normally runs and a distribution feature of abnormal parameter values of the target parameter in the target duration when the wavelength division multiplexing board device is faulty; and determine, from the at least one target parameter, the some or all target parameters used to warn of the fault parameter, where a difference between the distribution feature of the normal parameter values and the distribution feature of the abnormal parameter values that are of each of the determined some or all target parameters is greater than or equal to a preset standard value.

With reference to the second aspect or the foregoing implementations of the second aspect, in a tenth implementation of the second aspect, the apparatus further includes:

a warning unit, configured to warn of the fault parameter by monitoring the some or all of the at least one target parameter.

With reference to the second aspect or the foregoing implementations of the second aspect, in an eleventh implementation of the second aspect, the warning unit is specifically configured to: when detecting that one or more of warning parameters are abnormal, output warning information, where the warning parameters are the some or all of the at least one target parameter, and the warning information is used to give a prompt that the fault parameter is to be abnormal According to a third aspect, an embodiment of the present disclosure provides a device for locating a fault cause, including:

a memory, a processor, a communications interface, and a bus, where the memory, the processor, and the communications interface are connected and implement mutual communication by using the bus;

the memory is configured to store program code; and the processor reads the executable program code stored in the memory, to run a program corresponding to executable program code, so as to perform the method in the first aspect.

According to a fourth aspect, this application provides a computer readable storage medium, where the computer readable storage medium stores an instruction, and when the instruction is run on a computer, the computer is enabled to perform the method in the first aspect.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

To make the objectives, technical solutions, and advantages of the embodiments of the present disclosure clearer, the following clearly and completely describes the technical solutions of the embodiments of the present disclosure with reference to the accompanying drawings in the embodiments of the present disclosure. The embodiments in this application and the features in the embodiments may be mutually combined when they do not conflict with each other.

The embodiments of the present disclosure are applicable to a scenario of locating a fault cause of a wavelength division multiplexing board device. In the embodiments of the present disclosure, a target parameter that is very likely to result in abnormality of a fault parameter is determined by analyzing parameter values of running parameters and a parameter value of the fault parameter before the wavelength division multiplexing board device is faulty, to locate the fault cause, thereby improving accuracy of locating the fault cause of the wavelength division multiplexing board device.

Figure 1:
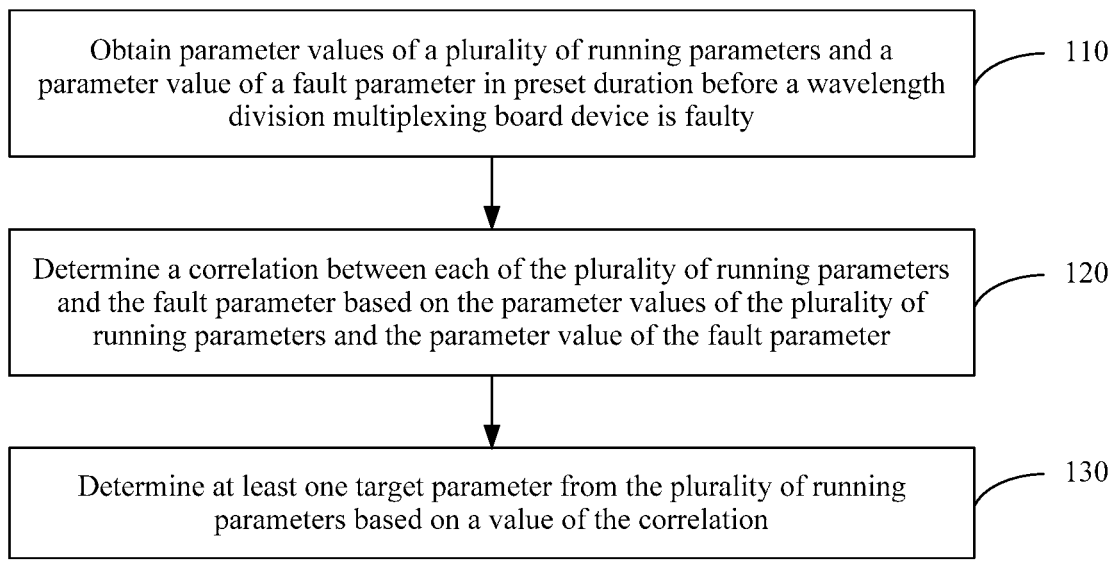
FIG. 1 is a schematic flowchart of a method for locating a fault cause according to an embodiment of the present disclosure.

FIG. 1 is a schematic flowchart of a method for locating a fault cause according to an embodiment of the present disclosure.

This embodiment of the present disclosure provides the method for locating a fault cause. As shown in FIG. 1, the method includes the following steps.

110. Obtain parameter values of a plurality of running parameters and a parameter value of a fault parameter in preset duration before a wavelength division multiplexing board device is faulty.

The fault parameter is a parameter that is abnormal when the wavelength division multiplexing board device is faulty. In this embodiment of the present disclosure, after the wavelength division multiplexing board device is faulty, the fault parameter that is abnormal when the wavelength division multiplexing board device is faulty may be determined, and a target parameter that affects the fault parameter is determined by analyzing the parameter values of the plurality of running parameters and the parameter value of the fault parameter before the wavelength division multiplexing board device is faulty, to locate a fault cause. Therefore, in this step, the parameter values of the plurality of running parameters and the parameter value of the fault parameter in the preset duration before the wavelength division multiplexing board device is faulty need to be first obtained. Both the parameter values of the running parameters and the parameter value of the fault parameter may be obtained from a log file of the wavelength division multiplexing board device, for example, may be obtained from key performance indicator (KPI) data of the log file. In this embodiment of the present disclosure, because the target parameter that affects the fault parameter needs to be determined, the parameter value of the fault parameter also needs to be analyzed. The parameter values of the plurality of running parameters may be parameter values of all or some running parameters in the log file in the preset duration before the wavelength division multiplexing board device is faulty.

In this embodiment of the present disclosure, a parameter other than the fault parameter in parameters of the wavelength division multiplexing board device is referred to as a running parameter. For example, the parameters of the wavelength division multiplexing board device include parameters A, B, C, D, and E. If the parameter D is a fault parameter, the parameters A, B, C, and E are referred to as running parameters. The parameter values of the plurality of running parameters may be parameter values of the parameters A, B, C, and E, or may be parameter values of the parameters A, B, and E.

It should be noted that when the wavelength division multiplexing board device is faulty, an operator may determine the fault parameter that is abnormal. A value of the preset duration may be determined according to a specific case. For example, when the fault parameter is abnormal, if a parameter value change trend of the fault parameter is relatively steady, the preset duration may be a relatively long time period (several days or a dozen of days). Usually, if the preset duration is longer, the determined target parameter is more accurate.

Each running parameter or the fault parameter usually has, in the preset duration, a plurality of parameter values separately collected at different sampling moments.

120. Determine a correlation between each of the plurality of running parameters and the fault parameter based on the parameter values of the plurality of running parameters and the parameter value of the fault parameter.

In this embodiment of the present disclosure, the target parameter is determined by analyzing the correlation between the running parameter and the fault parameter. Therefore, the correlation between each running parameter and the fault parameter needs to be first determined. The correlation represents a correlation degree between a parameter value change of a running parameter and a parameter value change of a fault parameter. In this embodiment of the present disclosure, because the fault cause is located by using the target parameter, a correlation is required between a parameter value change of the target parameter and a parameter value change of the fault parameter. Therefore, a correlation degree between each running parameter and the fault parameter needs to be determined.

It should be noted that in this embodiment of the present disclosure, there are a plurality of manners of determining the correlation between each running parameter and the fault parameter. For example, the correlation may be determined by using a mutual information algorithm, a cross-correlation function, and a clustering algorithm (for example, a DBSCAN clustering algorithm).

130. Determine at least one target parameter from the plurality of running parameters based on a value of the correlation.

The target parameter is used to locate a cause that results in abnormality of the fault parameter. For example, the target parameter may be used as a parameter that results in the abnormality of the fault parameter, that is, the target parameter is located as a direct cause that results in the abnormality of the fault parameter. Further, the fault cause may be further located, for example, a component (a component or a pin) to which the target parameter belongs or a component (a component or a pin) that results in abnormality of the target parameter is determined as a component that results in the abnormality of the fault parameter (that is, results in a fault of the wavelength division multiplexing board device).

After the correlation between each running parameter and the fault parameter is determined, the at least one target parameter may be determined from the plurality of running parameters based on the value of the correlation between each running parameter and the fault parameter, so that the fault cause can be located by using the target parameter.

One or more target parameters may be determined in this step. To accurately locate, by using the target parameter, the fault cause that results in the fault of the wavelength division multiplexing board device, generally, a strong correlation is required between the target parameter and the fault parameter. Therefore, the target parameter is closely related to the abnormality of the fault parameter, and the target parameter is very likely to result in the abnormality of the fault parameter (for example, the abnormality of the target parameter results in the abnormality of the fault parameter), that is, the target parameter is very likely to result in the fault of the wavelength division multiplexing board device. Therefore, a correlation between the fault parameter and each of the at least one target parameter determined in this step is greater than a correlation between the fault parameter and a running parameter other than the at least one target parameter in the plurality of running parameters, in other words, the correlation between each target parameter and the fault parameter is greater than a correlation between a non-target parameter and the fault parameter, and the non-target parameter is a running parameter other than the at least one target parameter that is determined in this step and that is in the plurality of running parameters in step 110.

In this embodiment of the present disclosure, there are a plurality of manners of determining the target parameter in step 130.

When the correlation between each running parameter and the fault parameter is determined by using the clustering algorithm, in a clustering result, a correlation between the fault parameter and a running parameter of a same type as the fault parameter is stronger than a correlation between the fault parameter and a running parameter of a type different from the fault parameter, in other words, the correlation between the fault parameter and the running parameter of a same type as the fault parameter is greater than the correlation between the fault parameter and the running parameter of a type different from the fault parameter. Therefore, the running parameter of a same type as the fault parameter may be determined as the target parameter.

When the correlation between each running parameter and the fault parameter is calculated by using a method such as the mutual information algorithm or the cross-correlation function, a correlation threshold may be set to determine a running parameter as the target parameter, where a value of a correlation between the running parameter and the fault parameter is greater than the correlation threshold. In this case, the correlation between the non-target parameter and the fault parameter is less than the correlation threshold, and it indicates that the correlation between the target parameter and the fault parameter is greater than the correlation between the non-target parameter and the fault parameter. Alternatively, the running parameters may be sorted in descending order of the values of the correlations, and M running parameters that rank first are determined as target parameters. In this case, the correlation between the target parameter and the fault parameter is greater than the correlation between the non-target parameter and the fault parameter. Alternatively, the foregoing manners may be combined, that is, after the running parameters are sorted in descending order of the correlations, a running parameter that ranks first and whose correlation with the fault parameter is greater than the correlation threshold is determined as the target parameter. M is an integer greater than 0. The correlation threshold may be preset, for example, may be specifically set according to experience. It should be noted that, when the target parameter is determined based on the correlation threshold, if there is no running parameter whose correlation with the fault parameter is greater than the correlation threshold, it may be determined that there is no target parameter.

This embodiment of the present disclosure may be executed by a collection device. The collection device obtains the target parameter by analyzing the collected parameter values of the plurality of running parameters and the collected parameter value of the fault parameter in the preset duration before the wavelength division multiplexing board device is faulty, and may further locate the fault cause based on the target parameter.

This embodiment of the present disclosure may be further executed by an analysis device that is different from the collection device. After obtaining data (namely, the parameter values of the plurality of running parameters and the parameter value of the fault parameter in the preset duration before the wavelength division multiplexing board device is faulty) by using step 110, the analysis device obtains the target parameter through analysis in step 120 and step 130. The analysis device may obtain the log file of the wavelength division multiplexing board device from the collection device, and obtain the data from the log file. The collection device is configured to: collect a parameter value of each parameter of the wavelength division multiplexing board device, and record the parameter value into the log file. After obtaining the target parameter through analysis, the analysis device may send the target parameter to the collection device. The collection device locates, based on the target parameter, the cause that results in the abnormality of the fault parameter.

In this embodiment of the present disclosure, the correlation between each running parameter and the fault parameter is determined by analyzing the parameter values of the running parameters and the parameter value of the fault parameter in the preset duration before the faulty wavelength division multiplexing board device is faulty, and the target parameter is determined based on the value of the correlation. In this way, in this embodiment of the present disclosure, the correlation between the determined target parameter and the fault parameter is relatively large. Therefore, the target parameter is very likely to result in the abnormality of the fault parameter, that is, the target parameter is very likely to result in the fault of the wavelength division multiplexing board device. Therefore, accuracy of locating a fault cause can be improved in this embodiment of the present disclosure.

In this embodiment of the present disclosure, the target parameter may be determined based on data of a case in which one wavelength division multiplexing board device is faulty, or the target parameter may be determined based on data of a case in which a plurality of wavelength division multiplexing board devices are faulty. In this embodiment of the present disclosure, the target parameter is determined through analysis and calculation, so that the cause that results in the abnormality of the fault parameter can be determined. According to the method, the fault cause can be accurately located through mathematical analysis based on a parameter value change of each running parameter of the wavelength division multiplexing board, and a fault cause component can be further located.

The correlation in this embodiment of the present disclosure may include at least one of a time correlation and a change correlation. The time correlation represents a correlation degree between a parameter value of a running parameter at a first moment and a parameter value of a fault parameter at a second moment, and the first moment is earlier than the second moment. The time correlation may be specifically calculated by using the cross-correlation function. The change correlation represents dependence between a parameter value change of a running parameter and a parameter value change of a fault parameter. The change correlation may be specifically calculated by using the mutual information algorithm. In this embodiment of the present disclosure, the target parameter may be determined based on one of the time correlation and the change correlation, or the target parameter may be determined based on the time correlation and the change correlation.

To more accurately determine the target parameter and more accurately locate the cause that results in the abnormality of the fault parameter in the wavelength division multiplexing board device, it may be ensured in step 130 that a time at which a parameter value of the determined at least one target parameter is abnormal is before a time at which the parameter value of the fault parameter is abnormal. This may be specifically ensured by using the time correlation.

Figure 2:
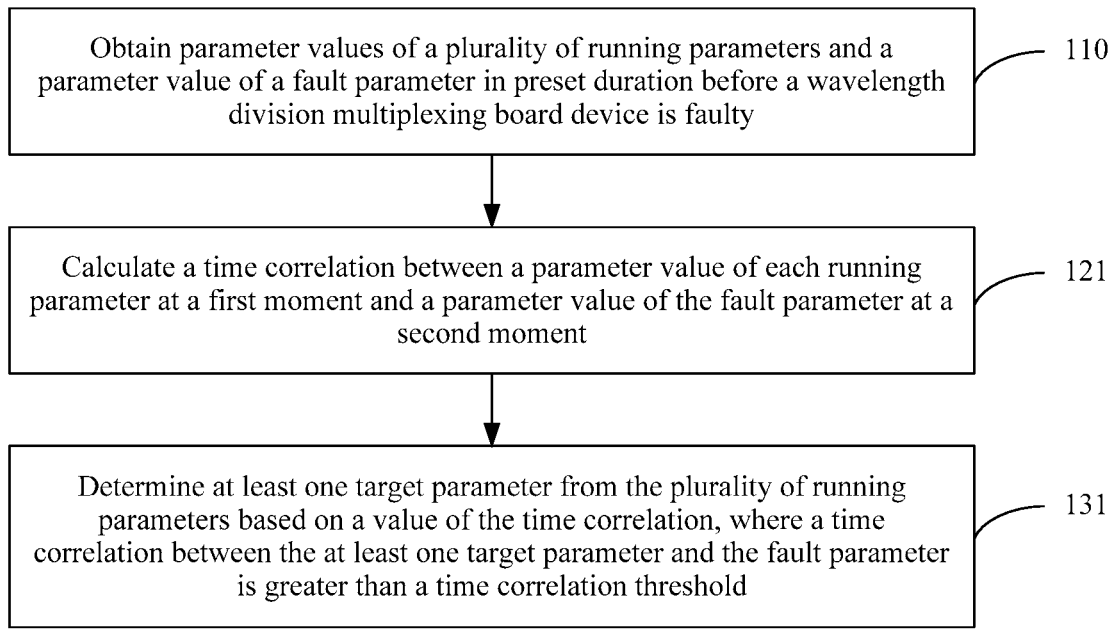
FIG. 2 is a schematic flowchart of another method for locating a fault cause according to an embodiment of the present disclosure.

In an optional implementation of this embodiment of the present disclosure, when the correlation includes the time correlation, as shown in FIG. 2, step 120 may be specifically performed as step 121 of calculating a time correlation between a parameter value of each running parameter at the first moment and a parameter value of the fault parameter at the second moment, and step 130 may be specifically performed as step 131 of determining the at least one target parameter from the plurality of running parameters based on a value of the time correlation, where a time correlation between the at least one target parameter and the fault parameter is greater than a time correlation threshold.

When the correlation includes the time correlation, in this embodiment of the present disclosure, the target parameter is determined by using the time correlation between the parameter value of each running parameter and the parameter value of the fault parameter. The time correlation represents a correlation degree between a parameter value of a running parameter at the first moment and a parameter value of a fault parameter at the second moment. Therefore, the time correlation between the parameter value of each running parameter at the first moment and the parameter value of the fault parameter at the second moment is determined in step 121, so that the value of the time correlation can be compared with the time correlation threshold in step 131, to determine, from the plurality of running parameters, the target parameter whose time correlation with the fault parameter is greater than the time correlation threshold.

It should be noted that, to improve accuracy of locating a fault cause, a parameter value change rule of the target parameter may meet the following requirement: The time at which the parameter value of the target parameter is abnormal is before the time at which the parameter value of the fault parameter is abnormal. The time correlation between each running parameter and the fault parameter represents a time correlation between a parameter value change rule of each running parameter and a parameter value change rule of the fault parameter, or represents a correlation between a parameter value change trend of each running parameter and a parameter value change trend of the fault parameter. Therefore, in this embodiment of the present disclosure, the time correlation between the parameter value of each running parameter at the first moment earlier than the second moment and the parameter value of the fault parameter at the second moment needs to be calculated in step 121, so that the target parameter that can be used to accurately locate the fault cause can be more accurately determined.

In this embodiment of the present disclosure, the time correlation between the parameter value of each running parameter and the parameter value of the fault parameter may be calculated in step 121 by using the cross-correlation function. For example, any one of the running parameters is z, and the fault parameter is y. Specifically, a formula for calculating a time correlation between a parameter value of z at a moment t and a parameter value of the fault parameter y at a moment $(t+\tau)$ may be shown in formula 1:

$$q(\tau) = \int_{-\infty}^{+\infty} f^*(t) g(t+\tau) dt \quad (1)$$

In formula 1, $q(\tau)$ represents the time correlation between the parameter value of the running parameter z at the moment t and the parameter value of the fault parameter y at the moment $(t+\tau)$, t represents a moment, $f^*(t)$ represents a conjugate complex number of $f(t)$, $f(t)$ represents a function in which a parameter value change probability of the running parameter z in the preset duration varies with time, $g(t)$ represents a function in which a parameter value change probability of the fault parameter y in the preset duration varies with time, $\tau$ represents a time offset, and $f^*(t)g(t+\tau)$ represents a correlation between a parameter value change probability of the fault parameter y at the moment $(t+\tau)$ and a parameter value change probability of the running parameter z at the moment t.

For example, if a value of $\tau$ is 10 minutes and it is determined that the correlation between the running parameter z and the fault parameter y is greater than the time correlation threshold, when the wavelength division multiplexing board device is faulty, the parameter value of the fault parameter y may be abnormal 10 minutes after the parameter value of the running parameter z is abnormal.

It should be noted that, a manner of calculating $f(t)$ in formula 1 may be as follows: A first time period change probability of the running parameter z is calculated by calculating a first time period change probability of the running parameter in the following step 1221, and then $f(t)$ is obtained by using the first time period change probability of the running parameter z. Likewise, a manner of calculating $g(t)$ in formula 1 may be as follows: A second time period change probability of the fault parameter y is calculated by calculating a second time period change probability of the fault parameter in following step 1221, and then $g(t)$ is obtained by using the second time period change probability of the fault parameter y.

When calculation is performed according to formula 1, different values of $\tau$ may be further set, to calculate time correlations between the fault parameter and each running parameter in case of different time offsets, and determine the target parameter based on the time correlations in case of different time offsets. For example, when τ is 10 minutes or 15 minutes, time correlations between the fault parameter and each running parameter are separately calculated. If no running parameter whose time correlation with the fault parameter is greater than the time correlation threshold exists when τ is 10 minutes, and a running parameter whose time correlation with the fault parameter is greater than the time correlation threshold exists when τ is 15 minutes, the running parameter is determined as the target parameter.

When the wavelength division multiplexing board device is faulty, the target parameter usually has been abnormal when the fault parameter is abnormal. Therefore, the time correlation between the fault parameter and each running parameter before the wavelength division multiplexing board device is faulty may be calculated by setting the value of τ, and then the target parameter is determined based on a calculated value of the time correlation. Generally, if the calculated value of the time correlation between the running parameter and the fault parameter is larger, the time correlation between the running parameter and the fault parameter is stronger.

In this embodiment of the present disclosure, the time correlation between each running parameter and the fault parameter is determined, the target parameter is determined based on the value of the time correlation, and the time at which the determined target parameter is abnormal is before the time at which the parameter value of the fault parameter is abnormal. Therefore, the cause that results in the abnormality of the fault parameter in the wavelength division multiplexing board device can be more accurately located.

Figure 3:
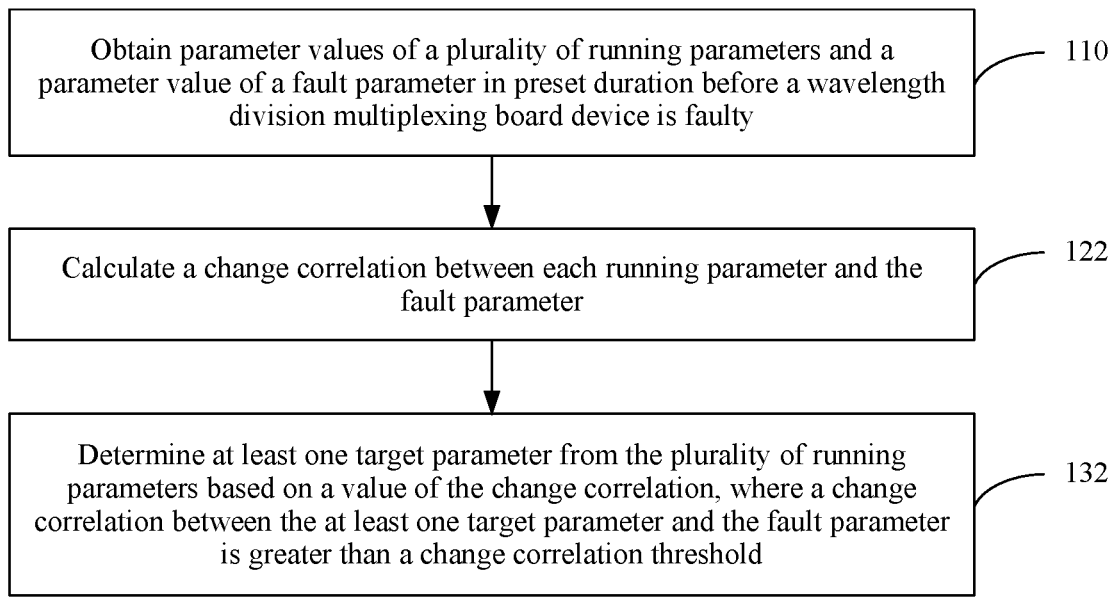
FIG. 3 is a schematic flowchart of still another method for locating a fault cause according to an embodiment of the present disclosure.

In another optional implementation of this embodiment of the present disclosure, when the correlation includes the change correlation, as shown in FIG. 3, step 120 may be specifically performed as step 122 of calculating a change correlation between each running parameter and the fault parameter, and step 130 may be specifically performed as step 132 of determining the at least one target parameter from the plurality of running parameters based on a value of the change correlation, where a change correlation between the at least one target parameter and the fault parameter is greater than a change correlation threshold.

When the correlation includes the change correlation, in this embodiment of the present disclosure, the target parameter is determined by using the change correlation between each running parameter and the fault parameter. Therefore, the change correlation between each running parameter and the fault parameter is determined in step 122, so that the value of the change correlation can be compared with the change correlation threshold in step 132, to determine, from the plurality of running parameters, the target parameter whose change correlation with the fault parameter is greater than the time correlation threshold.

The change correlation represents dependence between a parameter value change of a running parameter and a parameter value change of a fault parameter, and a larger change correlation between the running parameter and the fault parameter indicates stronger dependence between the parameter value change of the running parameter and the parameter value change of the fault parameter. Therefore, the target parameter can be determined from the plurality of running parameters based on the change correlation between the running parameter and the fault parameter, and there is relatively strong dependence between the parameter value change of the target parameter and the parameter value change of the fault parameter, so that the cause that results in the abnormality of the fault parameter can be located.

In this embodiment of the present disclosure, the change correlation between each running parameter and the fault parameter is determined, the target parameter is determined based on the value of the change correlation, and there is relatively strong dependence between the parameter value change of the determined target parameter and the parameter value change of the fault parameter. Therefore, the cause that results in the abnormality of the fault parameter in the wavelength division multiplexing board device can be more accurately located.

It should be noted that in the foregoing implementations of this embodiment of the present disclosure, the target parameter may be determined based on the time correlation by using step 121 and step 131, or the target parameter may be determined based on the change correlation by using step 122 and step 132. In this embodiment of the present disclosure, the target parameter may be alternatively determined based on both the time correlation and the change correlation. A specific process may be as follows: Step 120 is specifically performed as step 121 and step 122, and in step 130, the at least one target parameter is determined from the plurality of running parameters based on a value of the time correlation and a value of the change correlation, where a time correlation between the determined at least one target parameter and the fault parameter is greater than a time correlation threshold, and a change correlation between the at least one target parameter and the fault parameter is greater than a change correlation threshold. In this way, the target parameter is determined based on both the time correlation and the change correlation, thereby improving accuracy of determining the target parameter. In this embodiment of the present disclosure, when the target parameter is determined based on the time correlation and the change correlation, to simplify a calculation process, after step 110 is performed, step 122 may be first performed, to determine the change correlation between each running parameter and the fault parameter, and determine, from the running parameters based on the value of the change correlation, at least one to-be-determined target parameter whose change correlation with the fault parameter is greater than the change correlation threshold. Then, step 121 is performed, to determine a time correlation between each of the at least one to-be-determined target parameter and the fault parameter, and determine, from the to-be-determined target parameter based on the value of the time correlation, the at least one target parameter whose time correlation with the fault parameter is greater than the time correlation threshold.

To calculate the change correlation between each running parameter and the fault parameter, the parameter value of each running parameter may be mapped to a probability space for calculation. In this case, step 122 may be specifically performed as the following steps:

1221. Calculate a first change probability of each running parameter, a second change probability of the fault parameter, and a combined change probability of each running parameter and the fault parameter. 1222. Calculate the change correlation between each running parameter and the fault parameter based on the first change probability of each running parameter, the second change probability of the fault parameter, and the combined change probability of each running parameter and the fault parameter.

The first change probability represents a probability that a parameter value of a running parameter changes in the preset duration, the second change probability represents a probability that a parameter value of a fault parameter changes in the preset duration, and the combined change probability represents a probability that the parameter value of the running parameter and the parameter value of the fault parameter simultaneously change in the preset duration. In this embodiment of the present disclosure, the change correlation between each running parameter and the fault parameter is calculated by analyzing a relationship between a parameter value change probability of the running parameter and a parameter value change probability of the fault parameter.

Specifically, in this embodiment of the present disclosure, a calculation process in step 1221 may be specifically the following processes.

A. Divide the preset duration into at least two equal time periods.

In this embodiment of the present disclosure, the preset duration is divided into the at least two same time periods, and vectorized processing is performed on the parameter value of each running parameter on a basis of each time period.

It should be noted that a length of the preset duration is relatively long, and is usually in a unit of day. In this case, the parameter value of each running parameter has a relatively large change. Therefore, in this embodiment of the present disclosure, the preset duration is divided into N (N is an integer greater than 1) same time periods, and a time period change probability of each running parameter and a time period change probability of the fault parameter are calculated on a basis of each time period, so that the first change probability of each running parameter and the second change probability of the fault parameter are calculated, thereby improving calculation accuracy. In this embodiment of the present disclosure, the time period may be obtained through division by setting a preset value, and the preset value may be set based on the parameter value change trend of the fault parameter. For example, average duration in which the parameter value of the fault parameter repeatedly changes may be determined as a length of the time period. For example, when the fault parameter is a soft decision pre-correction bit error rate, the preset duration may be set to nine days, and the time period may be set to three hours. Values of the preset duration and the time period may be set by using a configuration file.

B. Calculate a first parameter value change range of each running parameter in the preset duration and a second parameter value change range of each running parameter in each time period based on the parameter value of each running parameter.

The first parameter value change range may be calculated by using a difference between a maximum value and a minimum value of the parameter value of the running parameter in the preset duration, or may be calculated by using a ratio of a maximum value to a minimum value of the parameter value of the running parameter in the preset duration. A maximum value and a minimum value in a change range of each running parameter of the wavelength division multiplexing board device may be determined based on the parameter value of the running parameter in the preset duration, so that the first parameter value change range can be calculated.

Likewise, the second parameter value change range of each running parameter in each time period may be calculated by using a difference between a maximum value and a minimum value of the parameter value of the running parameter in a corresponding time period, or may be calculated by using a ratio of a maximum value to a minimum value of the parameter value of the running parameter in a corresponding time period.

C. Determine a ratio of the second parameter value change range of each running parameter in each time period to the first parameter value change range as a first time period change probability of each running parameter in each time period.

For each running parameter, after the first parameter value change range and a second parameter value change range in any time period are calculated, a proportion of the second parameter value change range to the first parameter value change range is used as a first time period change probability of the running parameter in the time period, in other words, a ratio of the second parameter value change range to the first parameter value change range is the first time period change probability of the running parameter in the time period.

Figure 4:
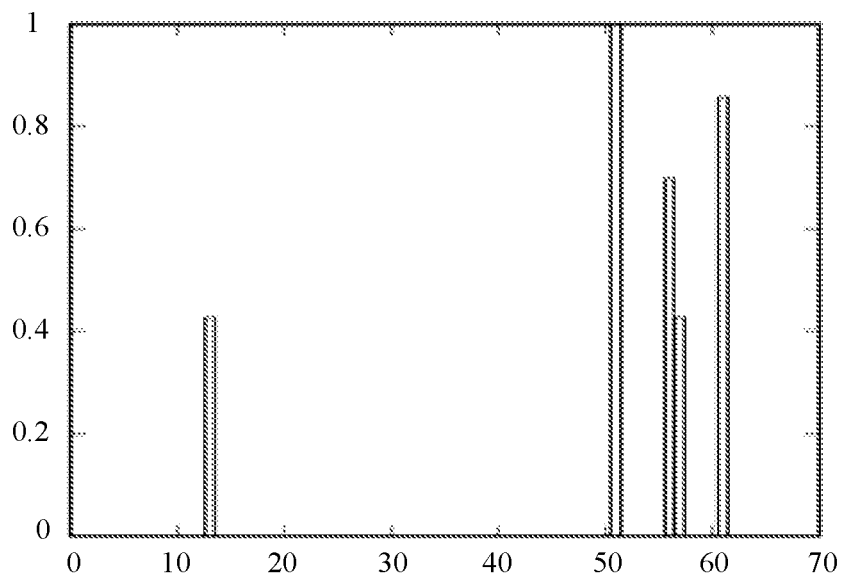
FIG. 4 is a schematic diagram of a result of calculating a change probability of a laser frequency of a wavelength division multiplexing board device according to an embodiment of the present disclosure.

For example, the running parameters include a laser frequency of the wavelength division multiplexing board device. The preset duration is set to nine days. The parameter values of the running parameters are obtained by using step 110. After the nine days are divided into 70 time periods, a first time period change probability in each time period is calculated based on a parameter value of the laser frequency, and a calculation result is shown in FIG. 4. In FIG. 4, a horizontal coordinate represents a quantity of time periods, and a vertical coordinate represents a value of the first time period change probability.

In this way, the first time period change probability of each running parameter in each time period may be calculated. A value of the first time period change probability is a number greater than or equal to 0 and less than or equal to 1.

D. Calculate a third parameter value change range of the fault parameter in the preset duration and a fourth parameter value change range of the fault parameter in each time period based on the parameter value of the fault parameter.

Based on a same principle as step B, the third parameter value change range and the fourth parameter value change range may be calculated.

E. Determine a ratio of the fourth parameter value change range of the fault parameter in each time period to the third parameter value change range as a second time period change probability of the fault parameter in each time period.

Based on a same principle as step C, the second time period change probability may be calculated.

It should be noted that the log file of the wavelength division multiplexing board device includes hundreds of thousands of different types of KPI data. Therefore, there are also hundreds of thousands of different types of running parameters of the wavelength division multiplexing board device, and the various running parameters are in different units, for example, voltage, a current, a bit error rate, dispersion, and power. Relationships between these running parameters are complex, and data types are different from each other. Therefore, parameter values of the running parameters cannot be directly compared and calculated, and normalized processing needs to be performed on the data first. In this embodiment of the present disclosure, a parameter value change probability of each running parameter in each time period is calculated on a basis of each time period obtained through division, to be specific, the parameter value change of each running parameter is mapped to the probability space, and a calculated change probability is a dimensionless value, thereby implementing normalization processing on each running parameter, so that the change correlation between each running parameter and the fault parameter is subsequently calculated.

F. Calculate the first change probability of each running parameter based on the first time period change probability of each running parameter in each time period, calculate the second change probability of the fault parameter based on the second time period change probability of the fault parameter in each time period, and calculate the combined change probability of each running parameter and the fault parameter based on the first time period change probability of each running parameter in each time period and the second time period change probability of the fault parameter in each time period.

After the first time period change probability of each running parameter in each time period is calculated, the first change probability of each running parameter may be calculated by using the first time period change probability of each running parameter in each time period. After the second time period change probability of the fault parameter in each time period is calculated, the second change probability of the fault parameter may be calculated by using the second time period change probability of the fault parameter in each time period. Then, the combined change probability of each running parameter and the fault parameter may be calculated based on the first time period change probability of each running parameter in each time period and the second time period change probability of the fault parameter in each time period.

In this embodiment of the present disclosure, the parameter value of each running parameter is mapped as a change probability that is used as a dimensionless value to measure an average change of each running parameter in each time period. Therefore, a change probability correlation can be calculated without considering a unit and a type of each running parameter, thereby implementing normalization of each running parameter.

For example, assuming any one of the running parameters is x and the fault parameter is y, a first change probability of x in the preset duration may be calculated based on a first time period change probability of x in each time period. A calculation formula may be shown in formula 2. A second change probability of y in the preset duration may be calculated based on a same principle, and a calculation formula may be shown in formula 3.

$$p(x) = \frac{\sum_{i=1}^{N} d_{x_i}}{N} \quad (2)$$

In formula 2, $p(x)$ represents the first change probability of the running parameter x in the preset duration, N represents a quantity of time periods, i represents an integer greater than or equal to 1 and less than or equal to N, and $d_{x_i}$ represents a change probability of the running parameter x in an $i^{th}$ time period.

$$p(y) = \frac{\sum_{i=1}^{N} d_{y_i}}{N} \quad (3)$$

In formula 3, $p(y)$ represents the second change probability of the fault parameter y in the preset duration, N represents the quantity of time periods, i represents the integer greater than or equal to 1 and less than or equal to N, and $d_{y_i}$ represents a change probability of the running parameter y in the $i^{th}$ time period.

After the first time period change probability of the running parameter x in each time period and a second time period change probability of the fault parameter y in each time period are calculated, a combined change probability $p(x, y)$ of x and y is calculated, and a calculation formula may be shown in formula 4:

$$p(x, y) = \frac{\sum_{i=1}^{N} [\min(d_{xi}, d_{yi}) / \max(d_{xi}, d_{yi})]}{N} \quad (4)$$

In formula 4, N represents the quantity of time periods, i represents the integer greater than or equal to 1 and less than or equal to N, $d_{x_i}$ represents the first time period change probability of the running parameter x in the $i^{th}$ time period, and $d_{y_i}$ represents the second time period change probability of the fault parameter y in the $i^{th}$ time period.

It should be noted that a time period in which both $d_{xi}$ and $d_{yi}$ are 0 means that x and y do not change in the time period. Therefore, when the combined change probability of x and y is calculated according to formula 2, the time period in which both $d_{xi}$ and $d_{yi}$ are 0 may not be used in formula 4 for calculation.

In this embodiment of the present disclosure, after the first change probability of each running parameter, the second change probability of the fault parameter, and the combined change probability of each running parameter and the fault parameter are calculated in step 1221 by using the foregoing processes, the change correlation between each running parameter and the fault parameter may be calculated in step 1222 through mutual information calculation.

For example, after $p(x)$, $p(y)$, and $p(x, y)$ are calculated according to formula 2, formula 3, and formula 4, a change correlation $k(x, y)$ between x and y may be calculated according to formula 5:

$$k(x, y) = -\left(\ln \frac{p(x, y)}{p(x)p(y)}\right) / \ln p(x, y) \quad (5)$$

For a meaning of each parameter in formula 5, refer to corresponding explanations in formula 1, formula 2, and formula 3.

In this embodiment of the present disclosure, the change correlation between each running parameter and the fault parameter is calculated based on the first time period change probability of the running parameter in each time period and the second time period change probability of the fault parameter in each time period, so that the target parameter can be determined based on the value of the change correlation. Implementation is simple and convenient, time is reduced, and resources are saved.

Figure 5:
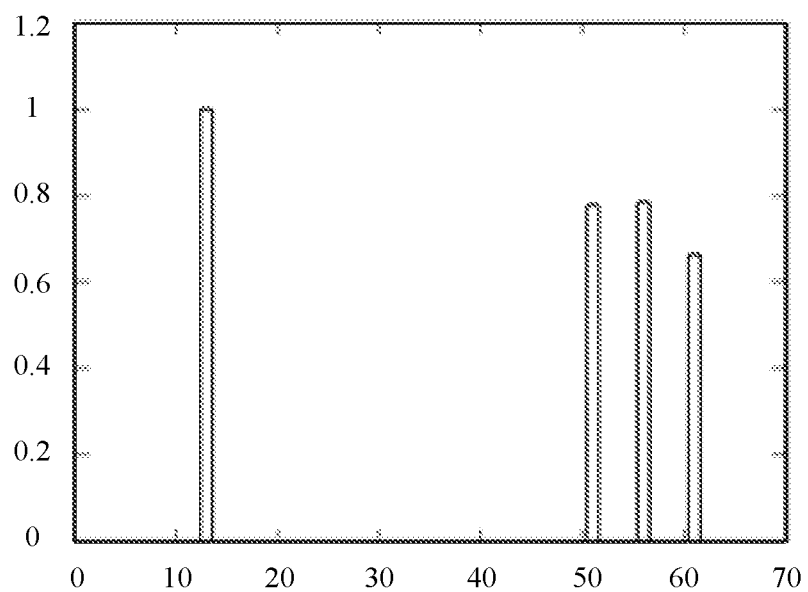
FIG. 5 is a schematic diagram of a result of calculating a change probability of a soft decision pre-correction bit error rate according to an embodiment of the present disclosure.

It should be noted that in this embodiment of the present disclosure, the fault parameter may be a soft decision pre-correction bit error rate. The preset duration is set to nine days. The parameter value of the fault parameter is obtained by using step 110. After the nine days are divided into 70 time periods, the first time period change probability in each time period is calculated based on the parameter value of the soft decision pre-correction bit error rate, and a calculation result is shown in FIG. 5. In FIG. 5, a horizontal coordinate represents a quantity of time periods, and a vertical coordinate represents a value of the first time period change probability. After the calculation in step 120 and step 130 is performed, the laser frequency of the wavelength division multiplexing board device is determined as the target parameter. It can be learned from comparison between FIG. 4 and FIG. 5 that a value of a time period change probability corresponding to the laser frequency of the wavelength division multiplexing board device is approximate to a value of a time period change probability corresponding to the soft decision pre-correction bit error rate, and a correlation between the laser frequency and the soft decision pre-correction bit error rate is a strong correlation.

In still another optional implementation of this embodiment of the present disclosure, some or all of the at least one target parameter determined in step 130 may be used to warn of the fault parameter. For ease of description, subsequently, a target parameter used to warn of the fault parameter may be referred to as a warning parameter.

In this embodiment of the present disclosure, the determined target parameter has a relatively strong correlation with the fault parameter, and the target parameter is very likely to result in the abnormality of the fault parameter. Therefore, when the target parameter is abnormal, the fault parameter is very likely to be abnormal. In this way, a part or all of the target parameter may be further used to warn of the fault parameter, so that the fault of the wavelength division multiplexing board device can be warned of.

In yet another optional implementation of this embodiment of the present disclosure, after the target parameter is determined in step 130, one or more warning parameters may be further determined from the at least one target parameter by using steps 140 and 150. The determined warning parameters may be some or all of the at least one target parameter.

Step 140. For each of the at least one target parameter, determine a distribution feature of normal parameter values of the target parameter in target duration when the wavelength division multiplexing board device normally runs and a distribution feature of abnormal parameter values of the target parameter in the target duration when the wavelength division multiplexing board device is faulty.

Step 150. Determine, from the at least one target parameter, the some or all target parameters used to warn of the fault parameter, where a difference between the distribution feature of the normal parameter values and the distribution feature of the abnormal parameter values that are of each of the determined some or all target parameters is greater than or equal to a preset standard value. The determined some or all target parameters are the warning parameters.

When a difference between a change trend of the normal parameter values of the target parameter and a change trend of the parameter values of the target parameter is relatively large, the abnormality of the target parameter can be apparently detected. However, when the difference between the change trend of the normal parameter values of the target parameter and the change trend of the abnormal parameter values of the target parameter is relatively small, an abnormal change of the target parameter may fail to be detected in a monitoring process. As a result, a monitoring failure is caused, and an abnormal change of the fault parameter cannot be warned of in a timely manner. Therefore, in this embodiment of the present disclosure, when the target parameter is used to warn of the fault parameter, the determined target parameter may be further determined, and a target parameter is selected as the warning parameter to warn of the fault parameter, where a difference between a change trend of normal parameter values of the target parameter and a change trend of abnormal parameter values of the target parameter is relatively large, thereby avoiding a case in which the abnormal change of the fault parameter cannot be warned of in a timely manner.

In this embodiment of the present disclosure, the change trend of the normal parameter values of the target parameter is represented by using the distribution feature of the normal parameter values of the target parameter in the target duration, and the change trend of the abnormal parameter values of the target parameter is represented by using the distribution feature of the abnormal parameter values of the target parameter in the target duration. A distribution feature of parameter values may include a variance of the parameter values, and the preset standard value may include a preset standard variance. When the distribution feature of the parameter values includes the variance of the parameter values, in this embodiment of the present disclosure, a variance of the normal parameter values of the target parameter and a variance of the abnormal parameter values of the target parameter may be compared. If the variance of the normal parameter values of the target parameter and the variance of the abnormal parameter values of the target parameter are greater than or equal to the preset standard variance, it indicates that the difference between the change trend of the normal parameter values of the target parameter and the change trend of the abnormal parameter values of the target parameter is relatively large, and the target parameter can be used to warn of the fault parameter. To improve accuracy of calculating the distribution feature of the parameter values, the distribution feature of the parameter values may further include an average value of the parameter values. In this case, this embodiment of the present disclosure, an average value of the normal parameter values of the target parameter and an average value of the abnormal parameter values of the target parameter may be compared, and the variance of the normal parameter values and the variance of the abnormal parameter values may be compared. If a difference between the average value of the normal parameter values of the target parameter and the average value of the abnormal parameter values of the target parameter is greater than or equal to a preset standard average value, and the variance of the normal parameter values of the target parameter and the variance of the abnormal parameter values of the target parameter are greater than or equal to the preset standard variance, it indicates that the difference between the change trend of the normal parameter values of the target parameter and the change trend of the abnormal parameter values of the target parameter is relatively large, and the target parameter can be used to warn of the fault parameter.

Figure 6:
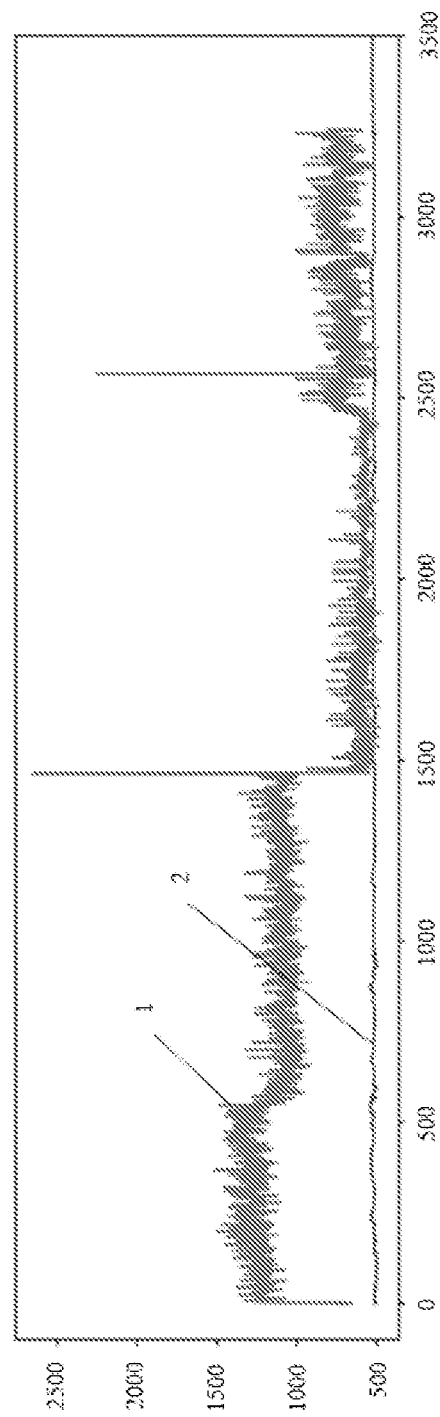
FIG. 6 is a schematic diagram of a parameter value change curve of line pin voltage according to an embodiment of the present disclosure.
Figure 7:
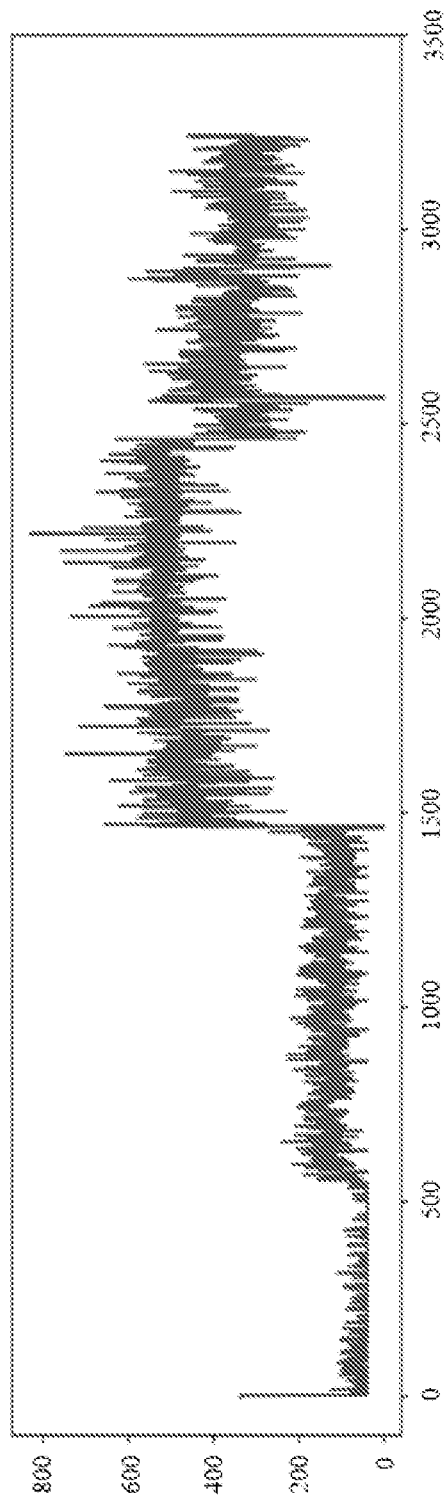
FIG. 7 is a schematic diagram of a parameter value change curve of optical power of a received signal of an optical module according to an embodiment of the present disclosure.

For example, when the fault parameter is optical power of a received signal of an optical module, the target parameter determined in step 130 is line pin voltage of the wavelength division multiplexing board device. As shown in FIG. 6, a curve 1 is a change curve of abnormal parameter values of the line pin voltage in the target duration when the wavelength division multiplexing board device is faulty, and a curve 2 is a change curve of normal parameter values of the line pin voltage in the target duration when the wavelength division multiplexing board device normally runs. FIG. 7 shows a parameter value change curve of the optical power of the received signal of the optical module in the target duration when the wavelength division multiplexing board device is faulty. In FIG. 6 and FIG. 7, a horizontal coordinate represents time, and a vertical coordinate represents a parameter value. It can be learned from FIG. 6 and FIG. 7 that when the wavelength division multiplexing board device is faulty, a time point at which a parameter value (the curve 2) of the line pin voltage changes is consistent with a time point at which a parameter value of the optical power of the received signal of the optical module changes. It indicates that a change correlation between the line pin voltage and the optical power of the received signal of the optical module is relatively strong. In this way, the line pin voltage can be used to locate a cause that results in a fault of the optical power of the received signal of the optical module, and is used as a target parameter of the optical power of the received signal of the optical module. It can be learned from curve changes of the curve 1 and the curve 2 in FIG. 6 that parameter values in the curve 1 are relatively distributed and are relatively large, and parameter values in the curve 2 are relatively consistent with each other and are relatively small. Therefore, a difference between a change trend of the curve 1 and a change trend of the curve 2 is relatively large, so that abnormality of the target parameter can be apparently detected. In this way, a monitoring requirement is met.

In yet another optional implementation of this embodiment of the present disclosure, after the target parameter is determined in step 130, the method may further include step 160 of warning of the fault parameter by monitoring the some or all (namely, the warning parameters) of the at least one target parameter.

After the warning parameters are determined, the fault parameter may be warned of by monitoring the warning parameters. In this embodiment of the present disclosure, the fault of the wavelength division multiplexing board device can be warned of by warning of the fault parameter. In addition, a component that results in the fault of the wavelength division multiplexing board device can be further located by using the fault parameter that is warned of.

Different warning algorithms may be selected in this embodiment of the present disclosure, such as a moving average algorithm, a variance monitoring algorithm, and a recurrent neural network (RNN) algorithm. After the warning algorithm is determined, changes of the warning parameters are calculated by using the warning algorithm by monitoring parameter values of the warning parameters, to identify abnormality of the warning parameters, and then warn of the fault parameter.

In an example of this embodiment of the present disclosure, in a process of monitoring the warning parameters in step 160, when it is detected that the warning parameters are abnormal, warning information may be output, to give a prompt that the fault parameter is to be abnormal. Specifically, when it is detected that one or more of the warning parameters are abnormal, the warning information may be output. When there is one warning parameter, the warning information may be output when it is detected that the warning parameter is abnormal. When there are a plurality of warning parameters, the warning information may be output when it is detected that any one of the warning parameters is abnormal, or the warning information may be output when all the warning parameters are abnormal.

Figure 8:
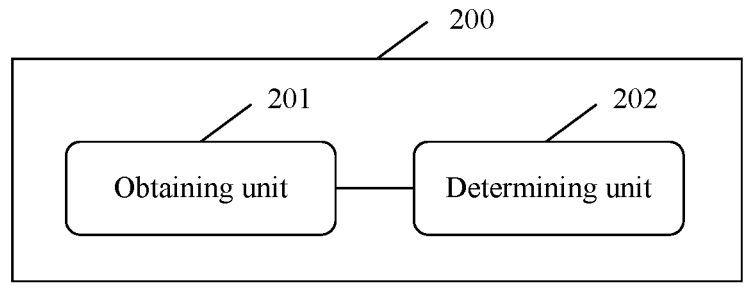
FIG. 8 is a schematic block diagram of an apparatus for locating a fault cause according to an embodiment of the present disclosure.

FIG. 8 is a schematic block diagram of an apparatus 200 for locating a fault cause according to an embodiment of the present disclosure. The apparatus 200 may be specifically an analysis device or a collection device. As shown in FIG. 8, the apparatus 200 includes:

an obtaining unit 201, configured to obtain parameter values of a plurality of running parameters and a parameter value of a fault parameter in preset duration before a wavelength division multiplexing board device is faulty, where the fault parameter is a parameter that is abnormal when the wavelength division multiplexing board device is faulty; and a determining unit 202, configured to determine a correlation between each of the plurality of running parameters and the fault parameter based on the parameter values of the plurality of running parameters and the parameter value of the fault parameter, where the correlation represents a correlation degree between a parameter value change of a running parameter and a parameter value change of a fault parameter.

The determining unit 202 is further configured to determine at least one target parameter from the plurality of running parameters based on a value of the correlation, where a correlation between each of the at least one target parameter and the fault parameter is greater than a correlation between the fault parameter and a running parameter other than the at least one target parameter in the plurality of running parameters.

In this embodiment of the present disclosure, the apparatus 200 determines the correlation between each running parameter and the fault parameter by analyzing the parameter values of the running parameters and the parameter value of the fault parameter in the preset duration before the faulty wavelength division multiplexing board device is faulty, and determines the target parameter based on the value of the correlation. In this way, in this embodiment of the present disclosure, the correlation between the determined target parameter and the fault parameter is relatively large. Therefore, the target parameter is very likely to result in abnormality of the fault parameter, that is, the target parameter is very likely to result in a fault of the wavelength division multiplexing board device. Therefore, accuracy of locating a fault cause can be improved in this embodiment of the present disclosure.

It may be understood that the correlation includes a time correlation, the time correlation represents a correlation degree between a parameter value of a running parameter at a first moment and a parameter value of a fault parameter at a second moment, and the first moment is earlier than the second moment.

The determining unit 202 is specifically configured to:

calculate a time correlation between a parameter value of each running parameter at the first moment and a parameter value of the fault parameter at the second moment; and determine the at least one target parameter from the plurality of running parameters based on a value of the time correlation, where a time correlation between the at least one target parameter and the fault parameter is greater than a time correlation threshold.

It may be understood that the correlation further includes a change correlation, and the change correlation represents dependence between a parameter value change of a running parameter and a parameter value change of a fault parameter.

The determining unit 202 is further configured to:

calculate a change correlation between each running parameter and the fault parameter; and determine the at least one target parameter from the plurality of running parameters based on the value of the time correlation and a value of the change correlation, where the time correlation between the at least one target parameter and the fault parameter is greater than the time correlation threshold, and a change correlation between the at least one target parameter and the fault parameter is greater than a change correlation threshold.

It may be understood that the correlation includes a change correlation, and the change correlation represents dependence between a parameter value change of a running parameter and a parameter value change of a fault parameter.

The determining unit 202 is specifically configured to:

calculate a change correlation between each running parameter and the fault parameter; and determine the at least one target parameter from the plurality of running parameters based on a value of the change correlation, where a change correlation between the at least one target parameter and the fault parameter is greater than a change correlation threshold.

It may be understood that when calculating the parameter value change correlation between each running parameter and the fault parameter, the determining unit 202 may be specifically configured to:

calculate a first change probability of each running parameter, a second change probability of the fault parameter, and a combined change probability of each running parameter and the fault parameter, where the first change probability represents a probability that a parameter value of a running parameter changes in the preset duration, the second change probability represents a probability that a parameter value of a fault parameter changes in the preset duration, and the combined change probability represents a probability that the parameter value of the running parameter and the parameter value of the fault parameter simultaneously change in the preset duration; and calculate the change correlation between each running parameter and the fault parameter based on the first change probability of each running parameter, the second change probability of the fault parameter, and the combined change probability of each running parameter and the fault parameter.

It may be understood that when calculating the first change probability of each running parameter, the second change probability of the fault parameter, and the combined change probability of each running parameter and the fault parameter, the determining unit 202 may be specifically configured to:

divide the preset duration into at least two equal time periods;

calculate a first parameter value change range of each running parameter in the preset duration and a second parameter value change range of each running parameter in each time period based on the parameter value of each running parameter;

determine a ratio of the second parameter value change range of each running parameter in each time period to the first parameter value change range as a first time period change probability of each running parameter in each time period;

calculate a third parameter value change range of the fault parameter in the preset duration and a fourth parameter value change range of the fault parameter in each time period based on the parameter value of the fault parameter;

determine a ratio of the fourth parameter value change range of the fault parameter in each time period to the third parameter value change range as a second time period change probability of the fault parameter in each time period; and calculate the first change probability of each running parameter based on the first time period change probability of each running parameter in each time period, calculate the second change probability of the fault parameter based on the second time period change probability of the fault parameter in each time period, and calculate the combined change probability of each running parameter and the fault parameter based on the first time period change probability of each running parameter in each time period and the second time period change probability of the fault parameter in each time period.

It may be understood that some or all of the at least one target parameter may be used to warn of the fault parameter.

Figure 9:
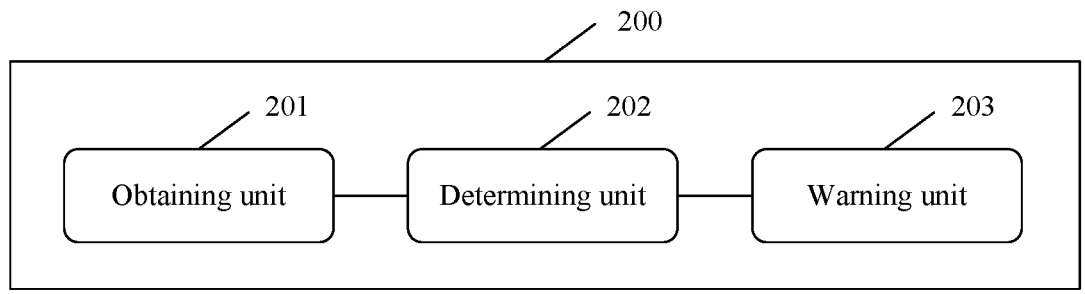
FIG. 9 is a schematic block diagram of an apparatus for locating a fault cause according to another embodiment of the present disclosure.

FIG. 9 is a schematic block diagram of the apparatus 200 for locating a fault cause according to another embodiment of the present disclosure.

It may be understood that the determining unit 202 is further configured to: determine a change range of normal parameter values of the target parameter in target duration when the wavelength division multiplexing board device normally runs and a change range of abnormal parameter values of the target parameter in the target duration when the wavelength division multiplexing board device is faulty; and determine, from the at least one target parameter, the some or all target parameters used to warn of the fault parameter, where a difference between a distribution feature of the normal parameter values and a distribution feature of the abnormal parameter values that are of each of the determined some or all target parameters is greater than or equal to a preset standard value.

It may be understood that as shown in FIG. 9, the apparatus 200 may further include:

a warning unit 203, configured to warn of the fault parameter by monitoring one or more warning parameters, where the warning parameters may be the some or all of the at least one target parameter.

It may be understood that the warning unit 203 is specifically configured to: when detecting that one or more of the warning parameters are abnormal, output warning information, where the warning information is used to give a prompt that the fault parameter is to be abnormal.

The apparatus 200 for locating a fault cause in this embodiment of the present disclosure may correspond to an execution body of the method for locating a fault cause in the embodiments of the present disclosure, and the foregoing and other operations and/or functions of the modules in the apparatus 200 for locating a fault cause are separately used to implement corresponding procedures of the methods in FIG. 1 to FIG. 7. For brevity, details are not described herein again.

Figure 10:
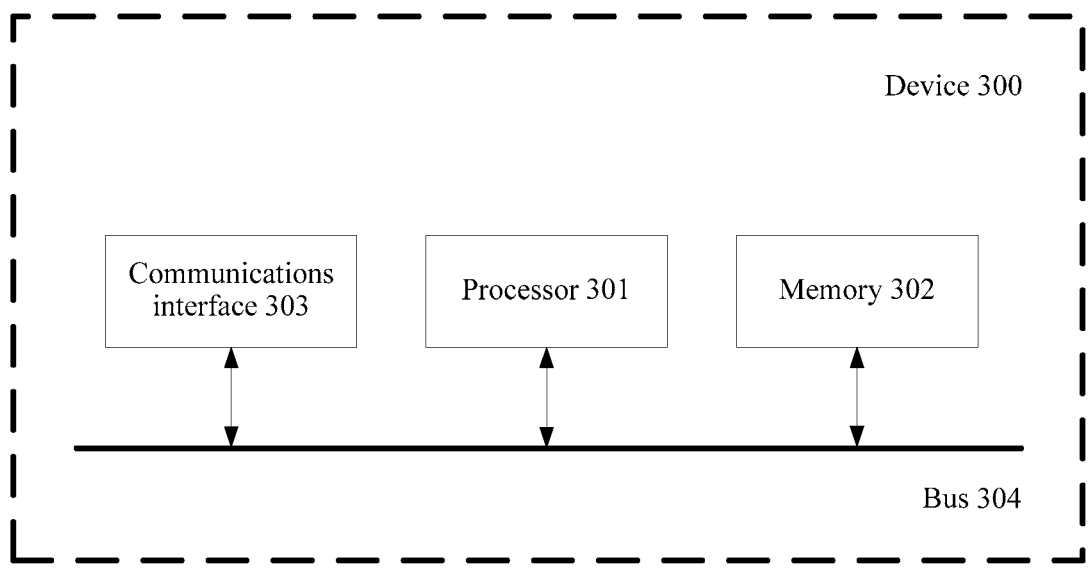
FIG. 10 is a schematic block diagram of a device for locating a fault cause according to an embodiment of the present disclosure.

FIG. 10 is a schematic block diagram of a device 300 for locating a fault cause according to an embodiment of the present disclosure. The device 300 may be specifically an analysis device or a collection device. The device 300 is connected to a plurality of hard disks. As shown in FIG. 10, the device 300 includes a processor 301, a memory 302, and a communications interface 303. The memory 302 is configured to store executable program code. The processor 301 reads the executable program code stored in the memory 302, to run a program corresponding to the executable program code. The communications interface 303 is configured to communicate with an external device. The device 300 may further include a bus 304. The bus 304 is configured to connect the processor 301, the memory 302, and the communications interface 303, so that the processor 301, the memory 302, and the communications interface 303 communicate with each other by using the bus 304.

The device 300 in this embodiment of the present disclosure may correspond to an execution body of the method for locating a fault cause in the embodiments of the present disclosure, and the operations and/or functions of the units in the device 300 are separately used to implement corresponding procedures of the methods in FIG. 1 to FIG. 7. For brevity, details are not described herein again.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method for locating a fault cause, comprising:
    obtaining parameter values of a plurality of running parameters and a parameter value of a fault parameter in a preset duration before a wavelength division multiplexing board device is faulty, wherein the fault parameter is a parameter that is abnormal when the wavelength division multiplexing board device is faulty;
    determining a correlation between each of the plurality of running parameters and the fault parameter based on the parameter values of the plurality of running parameters and the parameter value of the fault parameter, wherein the correlation comprises a time correlation, wherein the time correlation represents a correlation degree between a parameter value of a running parameter at a first moment and a parameter value of the fault parameter at a second moment, and the first moment is earlier than the second moment calculating a time correlation between a parameter value of each running parameter at the first moment and the parameter value of the fault parameter at the second moment; and
    determining at least one target parameter from the plurality of running parameters based on a value of the correlation, wherein a correlation between each of the at least one target parameter and the fault parameter is greater than a correlation between the fault parameter and a running parameter other than the at least one target parameter in the plurality of running parameters, wherein the determining at least one target parameter from the plurality of running parameters based on a the value of the correlation comprises:
    determining the at least one target parameter from the plurality of running parameters based on a value of the time correlation, wherein a time correlation between the at least one target parameter and the fault parameter is greater than a time correlation threshold.

2. The method according to claim 1, wherein the correlation further comprises a change correlation, and the change correlation represents a dependence between a parameter value change of a running parameter and a parameter value change of the fault parameter;
    the determining the correlation between each running parameter and the fault parameter based on the parameter values of the plurality of running parameters and the parameter value of the fault parameter further comprises:
    calculating a change correlation between each running parameter and the fault parameter; and
    the determining at least one target parameter from the plurality of running parameters based on the value of the correlation comprises:
    determining the at least one target parameter from the plurality of running parameters based on the value of the time correlation and a value of the change correlation, wherein the time correlation between the at least one target parameter and the fault parameter is greater than the time correlation threshold, and a change correlation between the at least one target parameter and the fault parameter is greater than a change correlation threshold.

3. The method according to claim 2, wherein the calculating the parameter value change correlation between each running parameter and the fault parameter comprises:
    calculating a first change probability of each running parameter, a second change probability of the fault parameter, and a combined change probability of each running parameter and the fault parameter, wherein the first change probability represents a probability that a parameter value of a running parameter changes in the preset duration, the second change probability represents a probability that a parameter value of the fault parameter changes in the preset duration, and the combined change probability represents a probability that the parameter value of the running parameter and the parameter value of the fault parameter simultaneously change in the preset duration; and
    calculating the change correlation between each running parameter and the fault parameter based on the first change probability of each running parameter, the second change probability of the fault parameter, and the combined change probability of each running parameter and the fault parameter.

4. The method according to claim 3, wherein the calculating the first change probability of each running parameter, the second change probability of the fault parameter, and the combined change probability of each running parameter and the fault parameter comprises:
    dividing the preset duration into at least two equal time periods;
    calculating a first parameter value change range of each running parameter in the preset duration and a second parameter value change range of each running parameter in each time period based on the parameter value of each running parameter;
    determining a ratio of the second parameter value change range of each running parameter in each time period to the first parameter value change range as a first time period change probability of each running parameter in each time period;
    calculating a third parameter value change range of the fault parameter in the preset duration and a fourth parameter value change range of the fault parameter in each time period based on the parameter value of the fault parameter;

determining a ratio of the fourth parameter value change range of the fault parameter in each time period to the third parameter value change range as a second time period change probability of the fault parameter in each time period; and calculating the first change probability of each running parameter based on the first time period change probability of each running parameter in each time period, calculating the second change probability of the fault parameter based on the second time period change probability of the fault parameter in each time period, and calculating the combined change probability of each running parameter and the fault parameter based on the first time period change probability of each running parameter in each time period and the second time period change probability of the fault parameter in each time period.

5. The method according to claim 1, wherein some or all of the at least one target parameter are used to warn of the fault.

6. The method according to claim 5, after the determining at least one target parameter from the plurality of running parameters based on the value of the correlation, further comprising:

for each of the at least one target parameter, determining a distribution feature of normal parameter values of the target parameter in a target duration when the wavelength division multiplexing board device normally runs and a distribution feature of abnormal parameter values of the target parameter in the target duration when the wavelength division multiplexing board device is faulty; and determining, from the at least one target parameter, the some or all target parameters used to warn of the fault, wherein a difference between the distribution feature of the normal parameter values and the distribution feature of the abnormal parameter values that are of each of the determined some or all target parameters is greater than or equal to a preset standard value.

7. The method according to claim 5, after the determining at least one target parameter from the plurality of running parameters based on the value of the correlation, further comprising:

warning of the fault by monitoring the some or all of the at least one target parameter.

8. The method according to claim 7, wherein the warning of the fault by monitoring the some or all of the at least one target parameter comprises:

when it is detected that one or more of warning parameters are abnormal, outputting warning information, wherein the warning parameters are the some or all of the at least one target parameter, and the warning information is used to give a prompt that the fault parameter is abnormal.

9. A method for locating a fault cause, comprising:

obtaining parameter values of a plurality of running parameters and a parameter value of a fault parameter in a preset duration before a wavelength division multiplexing board device is faulty, wherein the fault parameter is a parameter that is abnormal when the wavelength division multiplexing board device is faulty;

determining a correlation between each of the plurality of running parameters and the fault parameter based on the parameter values of the plurality of running parameters and the parameter value of the fault parameter, wherein the correlation represents a correlation degree between a parameter value change of a running parameter and a parameter value change of the fault parameter; and determining at least one target parameter from the plurality of running parameters based on a value of the correlation, wherein a correlation between each of the at least one target parameter and the fault parameter is greater than a correlation between the fault parameter and a running parameter other than the at least one target parameter in the plurality of running parameters, wherein the correlation comprises a change correlation, and the change correlation represents dependence between a parameter value change of a running parameter and a parameter value change of the fault parameter;

the determining the correlation between each running parameter and the fault parameter based on the parameter values of the plurality of running parameters and the parameter value of the fault parameter comprises:

calculating a change correlation between each running parameter and the fault parameter; and the determining at least one target parameter from the plurality of running parameters based on the value of the correlation comprises:

determining the at least one target parameter from the plurality of running parameters based on a value of the change correlation, wherein a change correlation between the at least one target parameter and the fault parameter is greater than a change correlation threshold.

10. An apparatus for locating a fault cause, comprising:
a processor; and
a non-transitory computer readable medium which contains computer-executable instructions;
the processor is configured to execute the computer-executable instructions to enable the apparatus to perform operations comprising:

obtaining parameter values of a plurality of running parameters and a parameter value of a fault parameter in a preset duration before a wavelength division multiplexing board device is faulty, wherein the fault parameter is a parameter that is abnormal when the wavelength division multiplexing board device is faulty;

determining a correlation between each of the plurality of running parameters and the fault parameter based on the parameter values of the plurality of running parameters and the parameter value of the fault parameter, wherein the correlation comprises a time correlation, wherein the time correlation represents a correlation degree between a parameter value of a running parameter at a first moment and a parameter value of the fault parameter at a second moment, and the first moment is earlier than the second moment calculating a time correlation between a parameter value of each running parameter at the first moment and the parameter value of the fault parameter at the second moment; and determining at least one target parameter from the plurality of running parameters based on a value of the correlation, wherein a correlation between each of the at least one target parameter and the fault parameter is greater than a correlation between the fault parameter and a running parameter other than the at least one target parameter in the plurality of running parameters, wherein the determining at least one target parameter from the plurality of running parameters based on a the value of the correlation comprises:

determining the at least one target parameter from the plurality of running parameters based on a value of the time correlation, wherein a time correlation between the at least one target parameter and the fault parameter is greater than a time correlation threshold.

11. The apparatus according to claim 10, wherein the correlation further comprises a change correlation, and the change correlation represents a dependence between a parameter value change of a running parameter and a parameter value change of the fault parameter;
the determining the correlation between each running parameter and the fault parameter based on the parameter values of the plurality of running parameters and the parameter value of the fault parameter further comprises:
calculating a change correlation between each running parameter and the fault parameter; and
the determining at least one target parameter from the plurality of running parameters based on the value of the correlation comprises:
determining the at least one target parameter from the plurality of running parameters based on the value of the time correlation and a value of the change correlation, wherein the time correlation between the at least one target parameter and the fault parameter is greater than the time correlation threshold, and a change correlation between the at least one target parameter and the fault parameter is greater than a change correlation threshold.

12. The apparatus according to claim 11, wherein the calculating the parameter value change correlation between each running parameter and the fault parameter comprises:
calculating a first change probability of each running parameter, a second change probability of the fault parameter, and a combined change probability of each running parameter and the fault parameter, wherein the first change probability represents a probability that a parameter value of a running parameter changes in the preset duration, the second change probability represents a probability that a parameter value of a fault parameter changes in the preset duration, and the combined change probability represents a probability that the parameter value of the running parameter and the parameter value of the fault parameter simultaneously change in the preset duration; and
calculating the change correlation between each running parameter and the fault parameter based on the first change probability of each running parameter, the second change probability of the fault parameter, and the combined change probability of each running parameter and the fault parameter.

13. The apparatus according to claim 12, wherein the calculating the first change probability of each running parameter, the second change probability of the fault parameter, and the combined change probability of each running parameter and the fault parameter comprises:
dividing the preset duration into at least two equal time periods;
calculating a first parameter value change range of each running parameter in the preset duration and a second parameter value change range of each running parameter in each time period based on the parameter value of each running parameter;
determining a ratio of the second parameter value change range of each running parameter in each time period to the first parameter value change range as a first time period change probability of each running parameter in each time period;
calculating a third parameter value change range of the fault parameter in the preset duration and a fourth parameter value range of the fault parameter in each time period based on the parameter value of the fault parameter;
determining a ratio of the fourth parameter value change range of the fault parameter in each time period to the third parameter value change range as a second time period change probability of the fault parameter in each time period; and
calculating the first change probability of each running parameter based on the first time period change probability of each running parameter in each time period, calculating the second change probability of the fault parameter based on the second time period change probability of the fault parameter in each time period, and calculating the combined change probability of each running parameter and the fault parameter based on the first time period change probability of each running parameter in each time period and the second time period change probability of the fault parameter in each time period.

14. The apparatus according to claim 10, wherein some or all of the at least one target parameter are used to warn of the fault.

15. The apparatus according to claim 14, after the determining at least one target parameter from the plurality of running parameters based on the value of the correlation, the processor is further configured to execute the computer-executable instructions to enable the apparatus to perform an operation comprising:
for each of the at least one target parameter, determining a distribution feature of normal parameter values of the target parameter in a target duration when the wavelength division multiplexing board device normally runs and a distribution feature of abnormal parameter values of the target parameter in the target duration when the wavelength division multiplexing board device is faulty; and
determining, from the at least one target parameter, the some or all target parameters used to warn of the fault, wherein a difference between the distribution feature of the normal parameter values and the distribution feature of the abnormal parameter values that are of each of the determined some or all target parameters is greater than or equal to a preset standard value.

16. The apparatus according to claim 14, after the determining at least one target parameter from the plurality of running parameters based on the value of the correlation, the processor is further configured to execute the computer-executable instructions to enable the apparatus to perform an operation comprising:
warning of the fault by monitoring the some or all of the at least one target parameter.

17. An apparatus for locating a fault cause, comprising:
a processor; and
a non-transitory computer readable medium which contains computer-executable instructions;
the processor is configured to execute the computer-executable instructions to enable the apparatus to perform operations comprising:
obtaining parameter values of a plurality of running parameters and a parameter value of a fault parameter in a preset duration before a wavelength division multiplexing board device is faulty, wherein the fault parameter is a parameter that is abnormal when the wavelength division multiplexing board device is faulty;

determining a correlation between each of the plurality of running parameters and the fault parameter based on the parameter values of the plurality of running parameters and the parameter value of the fault parameter, wherein the correlation represents a correlation degree between a parameter value change of a running parameter and a parameter value change of a the fault parameter; and determining at least one target parameter from the plurality of running parameters based on a value of the correlation, wherein a correlation between each of the at least one target parameter and the fault parameter is greater than a correlation between the fault parameter and a running parameter other than the at least one target parameter in the plurality of running parameters, wherein the correlation comprises a change correlation, and the change correlation represents a dependence between a parameter value change of a running parameter and a parameter value change of the fault parameter;

the determining the correlation between each running parameter and the fault parameter based on the parameter values of the plurality of running parameters and the parameter value of the fault parameter comprises:

calculating a change correlation between each running parameter and the fault parameter; and the determining at least one target parameter from the plurality of running parameters based on the value of the correlation comprises:

determining the at least one target parameter from the plurality of running parameters based on a value of the change correlation, wherein a change correlation between the at least one target parameter and the fault parameter is greater than a change correlation threshold.

18. A non-transitory computer readable storage medium, comprising an instruction, wherein when the instruction is run on a computer, the computer is enabled to perform operations comprising:

obtaining parameter values of a plurality of running parameters and a parameter value of a fault parameter in a preset duration before a wavelength division multiplexing board device is faulty, wherein the fault parameter is a parameter that is abnormal when the wavelength division multiplexing board device is faulty;

determining a correlation between each of the plurality of running parameters and the fault parameter based on the parameter values of the plurality of running parameters and the parameter value of the fault parameter, wherein the correlation comprises a time correlation, wherein the time correlation represents a correlation degree between a parameter value of a running parameter at a first moment and a parameter value of the fault parameter at a second moment, and the first moment is earlier than the second moment calculating a time correlation between a parameter value of each running parameter at the first moment and the parameter value of the fault parameter at the second moment; and determining at least one target parameter from the plurality of running parameters based on a value of the correlation, wherein a correlation between each of the at least one target parameter and the fault parameter is greater than a correlation between the fault parameter and a running parameter other than the at least one target parameter in the plurality of running parameters, wherein the determining at least one target parameter from the plurality of running parameters based on a the value of the correlation comprises:

determining the at least one target parameter from the plurality of running parameters based on a value of the time correlation, wherein a time correlation between the at least one target parameter and the fault parameter is greater than a time correlation threshold.

* * * * *